US008003219B2

(12) United States Patent
Cordonier et al.

(10) Patent No.: US 8,003,219 B2
(45) Date of Patent: Aug. 23, 2011

(54) COATING LIQUID, CONDUCTIVE FILM FORMED BY COATING LIQUID, AND FORMING METHOD THEREOF

(75) Inventors: Christopher Cordonier, Aichi (JP); Tetsuya Shichi, Aichi (JP); Takafumi Numata, Aichi (JP); Kenichi Katsumata, Aichi (JP); Akimasa Nakamura, Aichi (JP); Yasuhiro Katsumata, Aichi (JP); Teruo Komine, Aichi (JP); Kenichirou Amemiya, Aichi (JP); Makoto Yamashita, Aichi (JP); Akira Fujishima, Aichi (JP)

(73) Assignee: Central Japan Railway Company, Aichi (JP)

( * ) Notice: Subject to any disclaimer, the term of this patent is extended or adjusted under 35 U.S.C. 154(b) by 285 days.

(21) Appl. No.: 12/226,827

(22) PCT Filed: Jan. 31, 2007

(86) PCT No.: PCT/JP2007/051618
§ 371 (c)(1),
(2), (4) Date: Oct. 29, 2008

(87) PCT Pub. No.: WO2008/007469
PCT Pub. Date: Jan. 17, 2008

(65) Prior Publication Data
US 2010/0062281 A1   Mar. 11, 2010

(30) Foreign Application Priority Data
Jul. 13, 2006   (JP) .................. 2006-193415

(51) Int. Cl.
*B32B 17/06* (2006.01)
*B05D 3/02* (2006.01)
(52) U.S. Cl. ........ 428/432; 428/697; 428/689; 428/701; 428/703; 472/226

(58) Field of Classification Search .................. 428/432, 428/697, 689, 701, 703; 427/226
See application file for complete search history.

(56) References Cited

U.S. PATENT DOCUMENTS 6,576,302 B1 * 6/2003 Mizuta et al. ................. 427/597

FOREIGN PATENT DOCUMENTS

| JP | 6115934 | 4/1994 |
|---|---|---|
| JP | 6119816 | 4/1994 |
| JP | 9143786 | 6/1997 |
| JP | 10237078 | 9/1998 |
| JP | 11071103 | 3/1999 |
| JP | 2002042583 | 2/2002 |
| JP | 2006073267 | 3/2006 |
| JP | 6144950 | 8/2010 |

OTHER PUBLICATIONS

Office Action in counterpart CN App. No. 2007800265265227, dated May 20, 2010.
Office Action in counterpart CN App. No. 200780026522.7, dated May 20, 2010.
Office Action of Korean Patent Office in foreign counterpart Application No. 2008-7030716, dated Feb. 10, 2011, with partial translation.

* cited by examiner

*Primary Examiner* — Gwendolyn Blackwell
(74) *Attorney, Agent, or Firm* — Kinney & Lange, P.A.

(57) ABSTRACT

The present invention provides a technology related to a conductive film which is high in transparency, conductivity, and adhesiveness to a base plate. The present invention also provides a coating liquid including metal materials reacting with a ligand represented by a particular Chemical Formula and including indium (In), tin (Sn), or both thereof.

9 Claims, 1 Drawing Sheet

FIG. 1

(PRIOR ART)

IMINODIETHANOL COMPLEX

COATING LIQUID, CONDUCTIVE FILM FORMED BY COATING LIQUID, AND FORMING METHOD THEREOF

TECHNICAL FIELD

The present invention is related to a coating liquid used for forming a conductive film, a conductive film, a forming method thereof, and a product having a conductive film formed on a surface of the product.

BACKGROUND ART

A conductive film is applied in a wide rage of fields. Especially in fields related to displays, a conductive film is now essential for most display units such as a Plasma Display Panel (PDP), a Liquid Crystal Display (LCD) and an Organic Light Emitting Diode (OLED) display.

In application to these display related units, a gas-phase method, such as sputtering, is most commonly used, since a film formed by a gas-phase method is dense and accordingly low in resistivity as well as excellent in uniformity.

However, in a gas-phase method such as sputtering, there are problems in that large-sized equipments are required, it is not easy to maintain vacuum when forming a film having a large area, and a large quantity of energy is required to form a film. Furthermore, there are other problems such as lower formation rate, and low use efficiency of raw materials caused by low efficiency of target use.

To solve these problems, a liquid-phase method, as described below, can be used. A liquid-phase method is advantageous in that large-sized equipments are not required and energy consumption is low.

(i) A technique wherein ITO (Indium Tin Oxide) particles are dried together with a binder so as to form a film (see Patent Document 1).

(ii) A technique wherein a solution such as organic metal or mineral salt is sprayed using an atomizer onto a heated substrate and a solid phase is separated from a liquid phase so as to deposit as a film on the substrate (see Patent Document 2).

(iii) A technique wherein indium oxide and tin oxide are fixed in a sol solution which contains metal alkoxide obtained by a sol-gel method (see Patent Document 3).

(iv) A technique wherein a solution of organic metal (indium or tin) compound (complex) is coated such as to form a film, and a thin film is generated without sol-gel reaction process and fired (see Patent Document 4).

Patent Document 1: Unexamined Japanese Patent Publication No. 6-119816
Patent Document 2: Unexamined Japanese Patent Publication No. 2006-73267
Patent Document 3: Unexamined Japanese Patent Publication No. 10-237078
Patent Document 4: Unexamined Japanese Patent Publication No. 2002-42583

DISCLOSURE OF THE INVENTION

Problem to be Solved by the Invention

In the above-described technique (i), a binder to hold conductive particles on the surface is necessary. Since a binder resin typically forms an insulator, such as silica, lowering the resistivity of the formed film is limited.

In the above-described technique (ii), since some tens to some hundreds times of spraying are normally required to attain low resistivity, time efficiency of the process is lowered.

In the above-described technique (iii), since the progress of a condensation polymerization reaction is remarkably different depending on temperature and humidity, strict control of film-forming conditions is necessary to constantly obtain uniform films. Moreover, since the sol of a coating liquid is often unstable, there are many problems to be solved in an actual use, and some design is needed in order to maintain the viscosity of the sol and to prevent sedimentation of solid particles.

In the above-described technique (iv), a solution of chemically stable organic indium/tin complex is coated so as to generate a film without sol-gel reaction process, followed by firing to give an ITO film. However, in a complex molecule containing a conventionally used ligand, since the volume of an organic portion of a ligand in a film is large, when the film is fired in order to produce metallic oxide, the significant volume contraction is caused. Thus the adhesion strength cannot be increased. Therefore, the durability may not be sufficient depending on its use.

In addition, under some conditions, weak adhesion strength to a substrate causes the film to be separated from the substrate. In some cases, even if the film adheres to the substrate, many cracks can be found. In case of a transparent conductive film, occurrence of a small crack can lead to an increase of turbidity (haze). Thus, the technology (iv) is not preferable in a practical use. The problems involving crack formation and adhesion become critical especially when preparing a thick film. Therefore it is necessary to strictly control a film thickness in order to obtain a favorable film.

The present invention is made in consideration of the above issues. The purpose is to provide a technique related to a conductive film having high transparency and conductivity as well as high adherence to a substrate.

Means for Solving the Problem

A first invention of the present application to be made to solve the problems is related to a coating liquid including metallic materials reacting with a ligand represented by Chemical Formula 1 and including indium (In), tin (Sn) or both thereof.

[Formula 1]

Each of $R_{21}$-$R_{24}$ in Chemical Formula 1 is one of the following (1)-(10) and $X_{11}$ and $X_{12}$ is hetero atoms.

(1) a group represented by $C_lH_{2l+1}$ (aforementioned l is an integral number of 0 to 4), (2) a group represented by $C_nH_{2n-1}$ (aforementioned n is an integral number of 2 to 4),
(3) a group represented by COOR (aforementioned R is $C_pH_{2p+1}$ (aforementioned p is an integral number of 0 to 4) or a group represented by $R=C_6H_5$),
(4) a group represented by aldehyde, ketones, $COC_qH_{2q+1}$ (aforementioned q is an integral number of 0 to 4), or benzophenone,
(5) hydroxy (OH) or ethers,
(6) amine ($NH_2$) or alkylamine,
(7) amide
(8) halogens
(9) nitrile (CN)
(10) nitro ($NO_2$)

By using the coating liquid according to the present invention, a conductive film can be formed on a surface of a base plate. For example, when the coating liquid according to the present invention is applied on a surface of a base plate, a film including metal compound containing indium (hereinafter also referred as In), tin (hereinafter also referred as Sn), or both of In and Sn. Subsequently, when the film is fired, the above-described metal compound is decomposed by heat, ligands are lost, and a metal oxide film (a conductive film) including In, Sn, or both of In and Sn is formed.

A conductive film formed by using the coating liquid according to the present invention has high film density, does not have cracks formed thereon, and has an excellent adhesiveness to a base plate. Moreover, because film density is high, conductivity is high. Furthermore, since cracks are not formed, turbidity (haze) is low. Therefore a conductive film with transparency can be obtained.

The reason why film density is high and cracks are not formed, as described above, can be assumed as follows. That is, the metallic material reacting with a ligand represented by Chemical Formula 1 and including In, Sn or both of In and Sn has a flat structure as clear from the molecular structure represented in Chemical Formula 1. Thus, when the coating liquid is applied on a surface of a base plate and a film is formed, due to an interaction among the metal materials, a molecular assembly (stacking) is formed such that the metal materials are overlapped with one another.

Moreover, an interaction among aromatic rings included in the ligands contributes to the formation of the above-described molecular assembly. Therefore, even if the ligands are lost during firing, contraction in the volume in a direction parallel to the surface of a base plate is assumed to be inhibited, and occurrence of cracks and exfoliation is therefore assumed to be inhibited.

Figure 1:
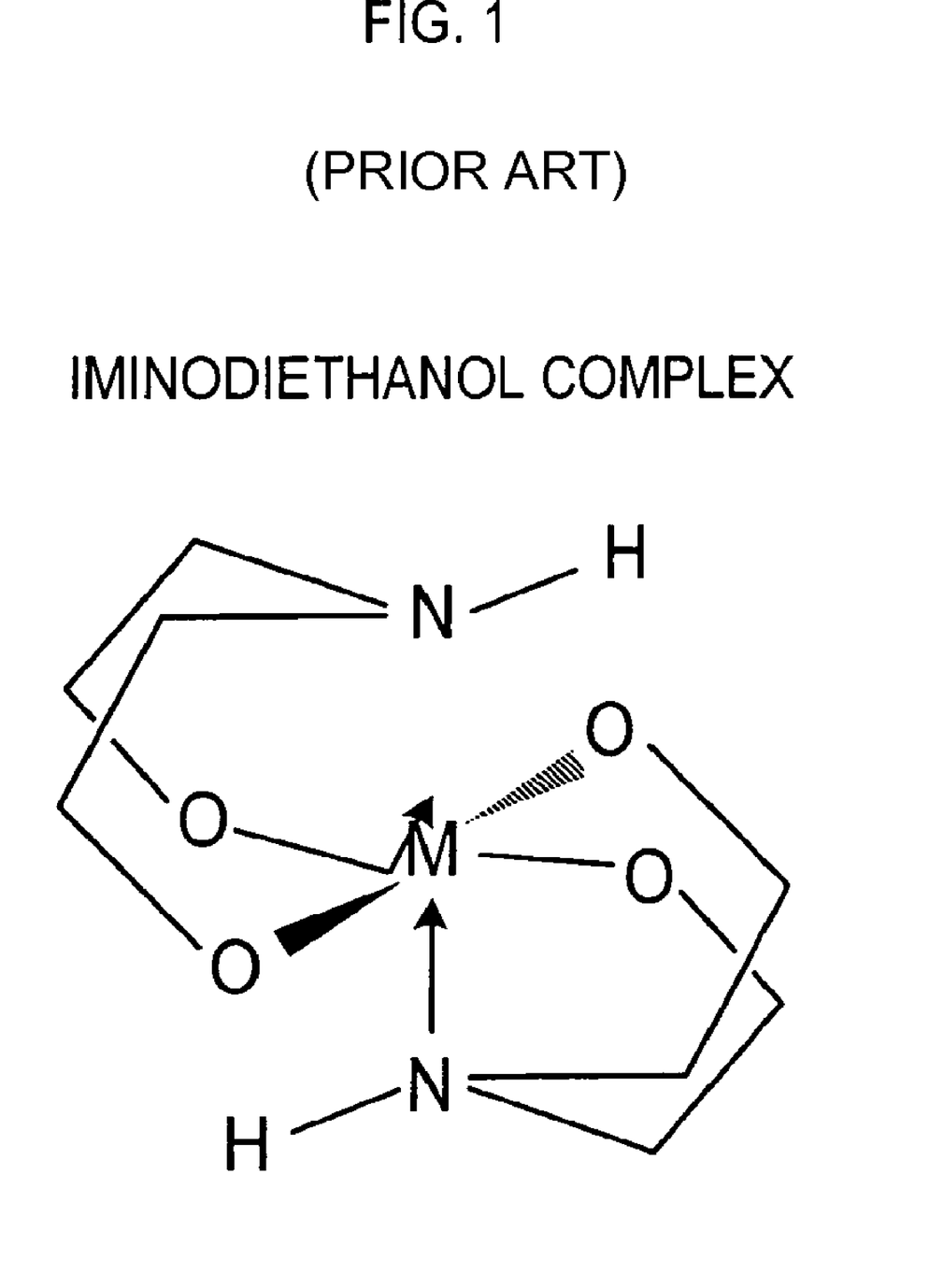
FIG. 1 is an explanatory view showing a molecular structure of iminodiethanol complex.

The reason why cracks and poor adhesiveness are caused when a metallic oxide film is formed by conventionally used organic metal complexes can be considered as follows. When a metallic atom forms a complex, bonds are formed through an outmost d-orbit. The bonds extend toward respective vertexes of a regular octahedron, wherein the metallic atom is positioned in the center, and a substitution group of the ligand exists on each of leading edges of the bonds. Thus, an ordinary organic metal complex has a three-dimensional structure having a metal in the center, such as the molecule structure shown in FIG. 1. Consequently, when a film, made of organic metal complexes, is fired, and the ligands are lost by heat decomposition, a large contraction in the volume in the three-dimensional space is caused. As a result, cracks, as well as exfoliation due to loss of matching in size with a base plate, are caused.

Moreover, a conductive film formed by using the coating liquid according to the present invention has a high degree of hardness. Furthermore, a conductive film formed by using the coating liquid according to the present invention is flat, smooth, and has high transparency. Therefore, in a case, for example, wherein a conductive film is formed on the surface of glass, the transparency of the glass can be maintained. In a case wherein a conductive film is formed on the surface of a mirror, the reflectivity of the mirror can be maintained.

Furthermore, the coating liquid according to the present invention can form a conductive film having durability even though the coating liquid does not contain a binder. Since the concentration of In oxide, Sn oxide or In—Sn oxide contained in the formed film, is not diluted by a binder, the effect of In oxide, Sn oxide or In—Sn oxide (for example, conductive effect) is high.

Still furthermore, since the coating liquid according to the present invention is stable, the coating liquid can be preserved for a long term.

Additionally, a metal oxide film (conductive film) formed by using the coating liquid according to the present invention exerts a function of a transparent conductive film.

The coating liquid according to the present invention can be easily produced. For example, the coating liquid can be made merely by adding, in a suitable solvent, a suitable amount, with respect to indium and tin atom, of catechol, which becomes a ligand, to raw material such as indium alkoxide and tin chloride, and thereafter heating the ingredients so as to produce In—Sn complexes. As necessary, the coating liquid can be recovered by performing filtering or evaporating the solvent.

Since the In/Sn complex has a flat structure, a molecular structure is formed such that the complex molecules are overlapped with one another (stacked molecular structure) when the In/Sn complex is coated and dried. Also an interaction among aromatic rings contributes to the stacked molecular structure.

The metallic material reacting with a ligand represented by the Chemical Formula 1 and including indium (In), tin (Sn), or both thereof is, for example, organic metal complexes represented by Chemical Formula 2 or Chemical Formula 3.

[Formula 2]

[Formula 3]

Each of $R_1$-$R_{20}$ in Chemical Formulas 2 and 3 is one of the numbered options noted in the first invention described above, and each of $X_1$-$X_{10}$ is hetero atoms.

The coating liquid according to the present invention can include, as a solvent, for example, alcohols (such as methanol, ethanol, 2-propanol, n-butanol, isobutanol), ethers (such as diethyl ether, MTBE, THF), ethylene glycol, monomethyl ether of ethylene glycol, dimetyl ether of ethylene glycol, hydrocarbon (such as octane, n-hexane, cyclohexane, benzene, toluene, xylene), dimethylsulfoxide (DMSO), amids (such as dimethylformamide), lactams (such as N-methylpyrrolidinone (NMP)), halides (such as carbon tetrachloride, chloroform, dibromomethane, dichloromethane), ketones (such as acetone, methyl ethyl ketone (MEK)), β-ketones (such as acetylacetone (acac)), esters (such as acetic ethyl), lactones (such as γ-butyrolactone, ε-caprolactone), nitroalkane (such as nitroethane, nitromethane), water, and so on.

Although the concentration of organic metal complexes in the coating liquid is not specifically limited, as long as the concentration does not exceed the solubility of organic metal complexes, the concentration is preferably, for example, 0.1 M-0.8 M. To form a conductive film in which two or more kinds of metal are uniformly mixed, an appropriate organic metal complex may be mixed in a desired proportion.

A second invention of the present application is related to a method for forming a conductive film including steps of applying the coating liquid, according to the above-described first invention, on a surface of a base plate so as to form and fire a film, and thereby change at least one metal containing material selected from a group including the metal containing materials contained in the film into a conductive film.

A conductive film formed according to the present invention does not have cracks formed thereon, and has an excellent adhesiveness to a base plate and high degree of hardness. Moreover, because cracks are not formed, as described above, a conductive film can be thicker.

Furthermore, a conductive film formed according to the present invention is hard, flat, and smooth, and has high transparency. Therefore, in a case, for example, wherein a conductive film is formed on the surface of glass, the transparency of the glass can be maintained. In a case wherein a conductive film is formed on the surface of a mirror, the reflectivity of the mirror can be maintained.

In addition, by using a coating liquid used in the present invention, a conductive film having durability can be formed even though the coating liquid does not contain a binder. Since the concentration of In oxide, Sn oxide or In—Sn oxide contained in the formed film is not diluted by a binder, the effect of In oxide, Sn oxide or In—Sn oxide (for example, conductive effect) is high.

Although the aforementioned base plate is not specifically limited, in a case wherein a firing method is used during the process for forming a conductive film, material having durability to firing temperature is preferable. Examples of the base plate include glass (such as PYREX (registered trademark) glass, soda glass, quartz glass), ceramics (such as alumina, zirconia, silica), and heat-resistant macromolecule resin (such as polyimide resin or the like).

Various methods can be used for the application of the coating liquid, as long as films can be formed by that wet method. Generally used coating methods, for example, spin coat, dip coat, spray coat methods and so on, may be used. Subsequent to the application of the coating liquid, films are preferably naturally dried at normal temperature and normal pressures. Then, firing of the films, for example, may be performed.

In order to change the above-described organic metal compound into a conductive film, there is a method, for example, wherein the coating liquid is applied and a formed film is fired. The firing temperature is preferable to be a temperature, for example, in a range of 350 to 1000° C.

When a firing temperature is 350° C. or above, since a dense film can be formed, a conductive film with a certain level of conductivity and transparency can be obtained. Furthermore, when a firing temperature is 700° C. or above, since a dense film can be formed, a transparent conductive film with higher conductivity can be obtained.

Also, when firing is performed in the air and further in a reductive atmosphere (in, for example, a nitrogen-hydrogen mixture gas atmosphere), a conductive film with further lower resistivity can be formed.

As described above, since a firing temperature can be a low temperature of approximately 350° C., a conductive film can be formed on the surface of a base plate which is not resistant to heat by using the coating liquid according to the present invention. Furthermore, even if a base plate is a soda glass, a conductive film can be formed without under coat. The firing temperature may be adjusted depending on a type of Material M and a desired crystalline phase of a conductive film.

A third invention of the present application is related to a conductive film formed by the method for forming a conductive film according to the above-described second invention.

A conductive film according to the present invention does not have cracks formed thereon, has high degree of hardness, and has an excellent adhesiveness to a base plate. Moreover, the conductive film according to the present invention is flat, smooth, and has high transparency. Therefore, in a case, for example, wherein a conductive film is formed on the surface of glass, the transparency of the glass can be maintained. In a case wherein a conductive film is formed on the surface of a mirror, the reflectivity of the mirror can be maintained.

Furthermore, since a conductive film according to the present invention does not have to contain a binder, the concentration of In oxide, Sn oxide or In—Sn oxide, contained in the formed film, is not diluted by a binder, and the effect of In oxide, Sn oxide or In—Sn oxide (for example, conductive effect) is high.

A fourth invention of the present application is related to a conductive film covered product including a base plate and a conductive film formed on a surface of the base plate by the method for forming a conductive film according to the above-described second invention.

In the conductive film covered product according to the present invention, the conductive film does not have cracks formed thereon, has high degree of hardness, and has an excellent adhesiveness to a base plate. Moreover, a conductive film according to the present invention is flat, smooth, and has high transparency. Therefore, in a case, for example, wherein a base plate is a glass, the transparency of the glass can be maintained. In a case wherein a base plate is a mirror, the reflectivity of the mirror can be maintained. Furthermore, since the conductive film according to the present invention does not have to contain a binder, the concentration of In oxide, Sn oxide or In—Sn oxide, contained in the formed film, is not diluted by a binder, and the effect of In oxide, Sn oxide or In—Sn oxide (for example, conductive effect) is high.

Although the aforementioned base plate is not specifically limited, in a case wherein a firing method is used during the process for forming a conductive film, material having durability to firing temperature is preferable. Examples of the base plate include glass (such as PYREX (registered trademark) glass, soda glass, quartz glass), ceramics (such as alumina, zirconia, silica), and heat-resistant macromolecule resin (such as polyimide resin or the like).

DETAILED DESCRIPTION OF PREFERRED EMBODIMENTS OF THE INVENTION

The present invention is described below based on embodiments.

Embodiments

The present invention is described based on embodiments.

(a) Producing Metal Complexes

A solution was prepared wherein an amount indicated in Table 1 of Compound A shown in Table 1 below was dissolved in a suitable amount of solvent (xylene). In the solution, respective amount indicated below of indium acetate and tin(IV)butoxide, finely crushed in a mortar, (tin butoxide was dropped) was blended. The blended liquid was refluxed for 1 hour, and then distilled at 132° C. until the amount of the blended liquid became half. Then volatile component of the residual blended liquid was evaporated under reduced pressure using a rotary evaporator. The residual solid content was further heated to 100° C. under vacuum using a vacuum drier so as to remove the residual volatile component thoroughly. A yield of each of the solid contents is shown in Table 1.

Even after the solid content was kept for 6 months or more, chemical change was not observed. Even though coating was performed in 6 months or more after production, there was no difference in electrical and chemical properties from a sample produced right after production.

TABLE 1

| Embodiment | Blending Amount (g) | | Compound A | | Solvent | |
|---|---|---|---|---|---|---|
| | Indium Acetate | Tin (IV) butoxide | Name | Blending Amount (g) | Amount (ml) | Yield (g) |
| 1 | 29.20 | 0.000 | Catechol | 16.500 | 200 | 27.70 |
| 2 | 0.00 | 10.300 | Catechol | 5.500 | 50 | 8.38 |
| 3 | 26.30 | 2.100 | Catechol | 16.000 | 200 | 26.60 |
| 4 | 1.05 | 0.082 | Phenylenediamine | 0.627 | 20 | 1.05 |
| 5 | 1.05 | 0.082 | 2-Aminophenol | 0.633 | 20 | 1.00 |
| 6 | 1.05 | 0.082 | 2-Aminothiophenol | 0.726 | 20 | 1.15 |
| 7 | 1.05 | 0.082 | Anthranilic Acid | 0.795 | 20 | 1.22 |
| 8 | 1.05 | 0.082 | Salicylic Acid | 0.801 | 20 | 1.23 |
| 9 | 1.05 | 0.082 | Thiosalicylic Acid | 0.894 | 20 | 1.32 |

(b) Producing Coating Liquids (Changes According to Composition of In and Sn in Coating Liquid)

Powders obtained by Embodiment 1 and Embodiment 2 shown in Table 1 were dissolved in the ratio shown in Table 2 below into 5 ml of solution wherein acetylacetone and toluene were blended in the ratio of 1:1, so that a coating liquid was obtained wherein the concentration of metallic ion was 0.5 M.

The solution (0.4 mL) was coated on a quartz glass plate (50×50×2t mm) by spin coat (at a revolution rate of 750 rpm during coating). Then, the coated glass base plate was fired for 1 hour at 900° C. (at a heating rate of 10° C./min, natural cooling) thereby to obtain a conductive film. Sheet resistance, total transmission rate, and turbidity of each of the conductive films are shown in Table 2.

Sheet resistance of the conductive film was measured based on JIS R 1635 by using a Σ-5 resistivity meter produced by NPS (using a KS-TC-40-TF-VR probe). Total transmission rate and turbidity were measured based on JIS Z 8722 by using NDH5000W produced by Nippon Denshoku Industries Co., Ltd.

The solution (0.4 mL) was coated on a quartz glass plate (50×50×2t mm) by spin coat (at a revolution rate of 750 rpm during coating). Then, the coated glass base plate was fired for 1 hour at 900° C. (at a heating rate of 10° C./min, natural cooling) thereby to obtain a conductive film.

Then a sample with a lowest resistivity was annealed for 1 hour at 500° C. (at a heating rate of 10° C./min, natural cooling) in a reductive atmosphere of $N_2$ and $H_2$ in the ratio of 96% and 4% (Embodiment 11-4A). Composition of the coating liquid before firing, and film thickness, resistivity, sheet resistance, total transmission rate, turbidity, and film hardness of the coating liquid after firing are shown in Table 3.

Sheet resistance and resistivity of the conductive film were measured based on JIS R 1635 by using a Σ-5 resistivity meter produced by NPS (using a KS-TC-40-TF-VR probe). Total transmission rate and turbidity were measured based on JIS Z 8722 by using NDH5000W produced by Nippon Denshoku

TABLE 2

| Embodiment | Embodiment 1 (In Compound) Powder Amount (mg) | Embodiment 2 (Sn Compound) Powder Amount (mg) | Ratio of Sn in In and Sn into ITO (atom. %) | Properties after Firing | | |
|---|---|---|---|---|---|---|
| | | | | Sheet Resistance (Ω/□) | Total Transmission Rate (%) | Turbidity (%) |
| 10-1 | 346.00 | 0.00 | 0.00 | 5728 | 78 | 0.65 |
| 10-2 | 343.00 | 4.23 | 1.01 | 1350 | 82 | 0.46 |
| 10-3 | 339.00 | 8.55 | 2.04 | 920 | 82 | 1.34 |
| 10-4 | 334.00 | 14.40 | 3.45 | 800 | 82 | 1.04 |
| 10-5 | 328.00 | 22.00 | 5.26 | 753 | 83 | 0.41 |
| 10-6 | 322.00 | 29.90 | 7.14 | 775 | 83 | 0.31 |
| 10-7 | 308.00 | 46.50 | 11.10 | 981 | 83 | 0.29 |
| 10-8 | 277.00 | 83.80 | 20.00 | 1335 | 83 | 0.26 |
| 10-9 | 242.00 | 126.00 | 30.00 | 15000 | 86 | 0.26 |
| 10-10 | 208.00 | 168.00 | 40.00 | 400000 | 88 | 0.29 |
| 10-11 | 173.00 | 209.00 | 50.00 | 700000 | 87 | 0.22 |
| 10-12 | 69.30 | 335.00 | 80.00 | Over the Limit of Measurement | 93 | 0.17 |
| 10-13 | 34.60 | 377.00 | 90.00 | Over the Limit of Measurement | 93 | 0.17 |
| 10-14 | 0.00 | 419.00 | 100.00 | Over the Limit of Measurement | 93 | 0.17 |

The above results show that sheet resistance is lowest when a ratio of Sn in In and Sn (doped amount) is approximately 5 atom. % at the time of forming a conductive film. Therefore, this composition (In:Sn=95:5) was used in all embodiments and comparative examples described below.

(Changes According to Solid Content Concentration in Coating Liquid)

According to the above results, an amount shown in Table 3 below of powder of Embodiment 3 in Table 1, which was synthesized such that composition of In and Sn precursors is an optimal value, was dissolved in 100 mL of solution wherein acetylacetone and toluene were blended in the ratio of 1:1, thereby to obtain a coating liquid. The obtained coating liquid did not produce sediment or the like, was chemically stable, and was able to be used in a same manner as the coating liquid just after production, even after 4 months has past from its production.

Industries Co., Ltd. In order to have film thickness, absorption of the coated base plate was measured at a light wavelength of 250 nm by using a spectrophotometer (Hitachi U-3310), film thickness was measured using SEM (Hitachi S-4800), and the correlation coefficient was obtained by using a formula below. With the obtained coefficient, film thickness of other samples were obtained by light absorption.

A formula to obtain a light absorption coefficient:

$$Abs. = 0.4343 \alpha l$$

Abs.: Absorbance

α: Light absorption coefficient l: Film thickness

Conditions for measuring hardness complied with a pencil scratching test (JIS K 5400).

TABLE 3

| Embodiment | Solid Content Amount (g) | Solvent Amount (ml) | Solid Content Concentration | After Firing | | | | | |
|---|---|---|---|---|---|---|---|---|---|
| | | | | Film Thickness (nm) | Resistivity (×10⁻³ Ωcm) | Sheet Resistance (Ω/□) | Total Transmission Rate (%) | Turbidity (%) | Film Hardness |
| 11-1 | 2.8 | 100 | 0.10M | 20 | 14.0 | 7390 | 92 | 0.18 | >9H |
| 11-2 | 7.0 | Same as Above | 0.25M | 40 | 6.3 | 1600 | 88 | 0.28 | >9H |
| 11-3 | 14.0 | Same as Above | 0.50M | 85 | 3.7 | 477 | 85 | 0.34 | >9H |
| 11-4 | 21.0 | Same as Above | 0.75M | 100 | 2.6 | 280 | 84 | 0.23 | >9H |
| 11-4A | Same as Above | Same as Above | Same as Above | Same as Above | 0.94 | 99 | 87 | 0.30 | — |

As it is clear from the above results, film thickness changed in proportion to solid content concentration of the coating liquid. Film hardness was more than 9 H indicating high hardness even when film was thicker. As film thickness increased, both resistivity and sheet resistance decreased. After reductive annealing was performed, resistivity and sheet resistance further decreased.

(Changes According to Firing Temperature)

Powders obtained by Embodiment 3 in Table 1 was dissolved into 5 mL of solution wherein acetylacetone and toluene were blended in the ratio of 1:1, so that a coating liquid was obtained wherein the concentration of metallic ion was 0.75 M. The solution (0.4 mL) was coated on a quartz glass plate (50×50×2t mm) by spin coat (at a revolution rate of 750 rpm during coating). Then, the coated glass base plate was fired for 1 hour at a temperature in the range of 350 to 1000° C. (at a heating rate of 10° C./min, natural cooling) thereby to obtain a conductive film. Resistivity and sheet resistance of the conductive film are shown in Table 4 below.

(Changes According to Number of Recoating)

Powders obtained by Embodiment 3 in Table 1 were dissolved into 5 ml of solution wherein acetylacetone and toluene were blended in the ratio of 1:1, so that a coating liquid was obtained wherein the concentration of metallic ion was 0.25 M. The solution (0.4 mL) was coated on a quartz glass plate (50×50×2t mm) by spin coat (at a revolution rate of 750 rpm during coating). Then, the coated glass base plate was fired for 1 hour at 900° C. (at a heating rate of 10° C./min, natural cooling) thereby to obtain a conductive film. Subsequently, resistivity, sheet resistance, optical properties and film hardness of the conductive film were measured. Furthermore, the coating process and firing were repeated 5 times. After firing was performed, a sample showing a lowest resistivity was annealed for 1 hour at 500° C. (at a heating rate of

TABLE 4

| Embodiment | Firing Temperature (° C.) | After Firing | | | | |
|---|---|---|---|---|---|---|
| | | Film Thickness (nm) | Resistivity (×10⁻³ Ωcm) | Sheet Resistance (Ω/□) | Total Transmission Rate (%) | Turbidity (%) |
| 12-0 | 350 | 100 | 2050 | 220000 | 86 | 0.20 |
| 12-1 | 400.0 | 100 | 124 | 13230 | 84 | 0.23 |
| 12-2 | 500.0 | 100 | 51 | 5424 | 84 | 0.23 |
| 12-3 | 600.0 | 100 | 31 | 3296 | 84 | 0.23 |
| 12-4 | 700.0 | 100 | 14 | 1507 | 84 | 0.23 |
| 12-5 | 800 | 100 | 7.0 | 741 | 84 | 0.23 |
| 12-6 | 900 | 100 | 2.6 | 280 | 84 | 0.23 |
| 12-7 | 1000 | 100 | 3.8 | 404 | 84 | 0.23 |

The above results show that conductivity manifests even when performing firing at 350° C., and optimal firing temperature is 900° C. in a case wherein firing is performed for 1 hour.

10° C./min, natural cooling) in a reductive atmosphere (Embodiment 13-5A).

Resistivity, sheet resistance, and optical properties of the conductive film are shown in Table 5 below.

TABLE 5

| Embodiment | Number of Coating and Firing | Film Thickness (nm) | Resistivity (×10⁻³ Ωcm) | After Firing | | | |
|---|---|---|---|---|---|---|---|
| | | | | Sheet Resistance (Ω/□) | Total Transmission Rate (%) | Turbidity (%) | Film Hardness |
| 13-1 | 1 | 35 | 7.3 | 2311 | 87 | 0.35 | >9H |
| 13-2 | 2 | 65 | 4.1 | 684 | 87 | 0.32 | >9H |
| 13-3 | 3 | 90 | 3.1 | 364 | 86 | 0.31 | >9H |
| 13-4 | 4 | 120 | 3.2 | 285 | 90 | 0.19 | >9H |
| 13-5 | 5 | 140.0 | 2.10 | 155 | 92 | 0.23 | >9H |
| 13-5A | 5 + A | Same as Above | 0.86 | 60 | 90 | 0.3 | — |

The above results showed that as the number of coating processes increase, film becomes thicker, and even so, film hardness is more than 9 H indicating high hardness. At the same time, as film thickness increased, resistivity and sheet resistance decreased. Changes of optical properties were hardly observed.

(Changes by Different Ligands and Solvents)

An amount shown in Table 6 of each of powders obtained by Embodiments 3 to 9 in Table 1 was dissolved into each of the solvents shown in Table 6 below, so that a coating liquid was obtained wherein the concentration of metallic ion was 0.25 M. The solution (0.4 mL) was coated on a quartz glass plate (50×50×2t mm) by spin coating (at a revolution rate of 750 rpm during coating). Then, the coated glass base plate was fired for 1 hour at 900° C. (at a heating rate of 10° C./min, natural cooling) thereby to obtain a conductive film. Subsequently, resistivity, sheet resistance, and optical properties of each of the conductive films were measured.

hour, and then distilled at 132° C. until the amount of the blended liquid became half. Then volatile component of the residual blended liquid was evaporated under reduced pressure using a rotary evaporator. The residual solid content was heated to 100° C. under vacuum using a vacuum desiccator so as to remove the residual volatile component thoroughly. A yield of solid content was 5.24 g. By dissolving 1.38 g of the obtained powders into 5 mL of toluene, a coating liquid was obtained wherein the concentration of metallic ion was 0.5 M.

Comparative Example 2

Indium acetate (0.692 g) and tin(IV)butoxide (0.054 g), finely crushed in a mortar, (tin butoxide was dropped) were added into solution wherein acethylacetone (2.5 mL) and toluene (2.5 mL) were blended, so that a coating liquid was obtained wherein the concentration of metallic ion was 0.5 M.

TABLE 6

| Embodiment | Powder | Powder Amount (g) | Solvent | After Firing | | | | |
|---|---|---|---|---|---|---|---|---|
| | | | | Film Thickness (nm) | Resistivity (×10⁻³ Ωcm) | Sheet Resistance (Ω/□) | Total Transmission Rate (%) | Turbidity (%) |
| 14-1 | Embodiment 3 | 7.00 | 2-Aminoethanol (50 ml) + Ethanol (150 ml) | 65 | 4.4 | 724 | 85 | 0.23 |
| 14-2 | Embodiment 4 | 6.93 | Acethylacetone (50 ml) + Toluene (50 ml) | 49 | 6.5 | 1406 | 89 | 3.69 |
| 14-3 | Embodiment 5 | 6.96 | Same as Above | 45 | 5.2 | 1230 | 86 | 1.57 |
| 14-4 | Embodiment 6 | 7.58 | Same as Above | 40 | 13 | 3467 | 86 | 0.33 |
| 14-5 | Embodiment 7 | 8.03 | Same as Above | 52 | 5.4 | 1110 | 91 | 0.35 |
| 14-6 | Embodiment 8 | 8.07 | Same as Above | 51 | 7.4 | 1558 | 91 | 0.32 |
| 14-8 | Embodiment 9 | 8.68 | Same as Above | 24 | 15.0 | 6733 | 90 | 0.26 |

From the above results, conductivity and base plate's transparency were confirmed even in a case where solvents or ligands other than those used in Embodiment 3 in Table 1 are applied.

(C) COMPARATIVE EXAMPLES

Comparative Example 1

A solution was prepared wherein 4.180 g of ethylhexanoate was dissolved into 20 mL of solvent (xylene). In the solution, 2.630 g of indium acetate and 0.206 g of tin(IV) butoxide, finely crushed in a mortar, (tin butoxide was dropped) were blended. The blended liquid was refluxed for 1

Comparative Example 3

Indium nitrate trihydrate (0.840 g) and tin(IV)butoxide (0.054 g) (tin butoxide was dropped) were added into solution wherein acetylacetone (2.5 mL) and toluene (2.5 mL) were blended, so that a coating liquid was obtained wherein the concentration of metallic ion was 0.5 M.

Performance of Comparative Examples

The coating liquid (0.4 mL) obtained by each of Comparative Examples 1 to 3 was coated on a quartz glass plate (50×50×2t mm) by spin coat (at a revolution rate of 750 rpm during coating). Then, the coated glass base plate was fired for 1 hour at 900° C. (at a heating rate of 10° C./min, natural cooling) thereby to obtain a conductive film. Film thickness, resistivity, sheet resistance, and optical properties of each of the conductive films are shown in Table 7 below.

TABLE 7

| Comparative Example | Powder | After Firing | | | | |
|---|---|---|---|---|---|---|
| | | Film Thickness (nm) | Resistivity ($\times 10^{-3}$ $\Omega$cm) | Sheet Resistance ($\Omega/\square$) | Total Transmission Rate (%) | Turbidity (%) |
| 4-1 | Comparative Example 1 | 77 | 13.9 | 1945 | 89 | 37.80 |
| 4-2 | Comparative Example 2 | 16 | $\infty$ | $\infty$ | 90 | 8.09 |
| 4-3 | Comparative Example 3 | 52 | 29.4 | 6118 | 92 | 0.83 |

(Comparison 1: Comparison by Ligand)

Comparison among each of an embodiment and comparative examples by different ligands is shown in Table 8 below. Each of the samples is coated with a solution wherein the concentration of metallic ion is 0.5 M.

TABLE 8

| Sample | After Firing | | | | |
|---|---|---|---|---|---|
| | Film Thickness (nm) | Resistivity ($\times 10^{-3}$ $\Omega$cm) | Sheet Resistance ($\Omega/\square$) | Total Transmission Rate (%) | Turbidity (%) |
| Embodiment 11-3 | 85 | 3.7 | 477 | 85 | 0.34 |
| Comparative Example 4-1 | 77 | 13.9 | 1945.0 | 89 | 37.8 |
| Comparative Example 4-2 | 16 | $\infty$ | $\infty$ | 90 | 8.09 |
| Comparative Example 4-3 | 52 | 29.4 | 6118 | 92 | 0.83 |

The above table shows that, even though the concentration of each solution is same, the embodiment has thicker film, and is lower in resistivity, sheet resistance, and turbidity than comparative examples. This means that a film obtained by the embodiment is dense and has higher transparency.

In order to have film density, refractive index was measured at a light wavelength of 550 nm by using a DHA-XAVW/S6 ellipsometer produced by Mizojiri Optical Co., Ltd. Then film porosity was obtained by using a formula below. The results are compared in Table 9 below.

Formula to Obtain Porosity $$P = 1 - (n_p^2 - 1)/(n_d^2 - 1)$$

P: Porosity
$N_p$: Refractive index of dense film
$N_d$: Refractive index of porous film

TABLE 9

| Sample | Film Refractive Index | Porosity | Resistivity ($\times 10^{-3}$ $\Omega$cm) |
|---|---|---|---|
| Embodiment 11-3 | 1.777 | 13.2% | 3.7 |
| Comparative Example 4-3 | 1.487 | 56.7% | 29.4 |

The above results show that a film obtained in the embodiment is dense (low in porosity) and also is low in resistivity.

(Comparison 2: Comparison According to Number of Recoating)

Comparison between a film which is recoated with a coating liquid having a low concentration and fired, and a film which is coated once with a coating liquid having a high concentration, is shown in Table 10 below.

TABLE 10

| Sample | Coating Liquid Concentration | Number of Coating | After Firing | | | | |
|---|---|---|---|---|---|---|---|
| | | | Film Thickness (nm) | Resistivity ($\times 10^{-3}$ $\Omega$cm) | Sheet Resistance ($\Omega/\square$) | Total Transmission Rate (%) | Turbidity (%) |
| Embodiment 11-4 | 0.75 | 1 | 100 | 2.6 | 280 | 84 | 0.34 |
| Embodiment 13-1 | 0.25 | 1.0 | 35 | 7.3 | 2311 | 87 | 0.35 |

TABLE 10-continued

| | | | After Firing | | | | |
|---|---|---|---|---|---|---|---|
| Sample | Coating Liquid Concentration | Number of Coating | Film Thickness (nm) | Resistivity (×10$^{-3}$ Ωcm) | Sheet Resistance (Ω/□) | Total Transmission Rate (%) | Turbidity (%) |
| Embodiment 13-2 | 0.25 | 2.0 | 65 | 4.1 | 684 | 87 | 0.32 |
| Embodiment 13-3 | 0.25 | 3.0 | 90 | 3 | 364 | 86 | 0.31 |

The above results show that, even though a coating liquid having a low concentration is recoated and fired, there is little difference in performance from a film which is coated once with a coating liquid having a high concentration. This means that, with a coating liquid of the embodiment, a film, which is thick, dense, and high in transparency, can be prepared by a single coating.

It is to be noted that the present invention is not limited to the above-described embodiments, and that the present invention can be carried out in various ways without departing from the scope of the invention.

What is claimed is:

1. A coating liquid including metal materials reacting with a ligand represented by Chemical Formula 1 and including indium (In), tin (Sn), or both thereof, wherein each of $R_{21}$-$R_{24}$ in the Chemical Formula 1 is one of:

[Formula 1]

(1) a group represented by $C_lH_{2l+1}$ (aforementioned l is an integral number of 0 to 4);
(2) a group represented by $C_nH_{2n-1}$ (aforementioned n is an integral number of 2 to 4);
(3) a group represented by COOR (aforementioned R is $C_pH_{2p+1}$ (aforementioned p is an integral number of 0 to 4) or a group represented by R=$C_6H_5$);
(4) a group represented by aldehyde, ketones, $COC_qH_{2q+1}$ (aforementioned q is an integral number of 0 to 4), or benzophenone;
(5) hydroxyl (OH) or ethers;
(6) amine ($NH_2$) or alkylamine;
(7) amide;
(8) halogens;
(9) nitrile (CN); and
(10) nitro ($NO_2$), and wherein $X_{11}$ and $X_{12}$ in the Chemical Formula 1 is hetero atoms.

2. The coating liquid according to claim 1 wherein the metal material reacting with a ligand represented by the Chemical Formula 1 and including indium (In), tin (Sn), or both thereof is organic metal complexes represented by Chemical Formula 2 (for In) or Chemical Formula 3 (for Sn) or both (for both In and Sn), wherein each of $R_1$-$R_{20}$ in Chemical Formulas 2 and 3 is one of (1) to (10) in claim 1, and each of $X_1$-$X_{10}$ is hetero atoms.

[Formula 2]

[Formula 3]

3. The coating liquid according to claim 2 wherein a solution contains 0.1 M to 0.8 M of at least one organic metal material selected from a group including the organic metal complexes represented by Chemical Formula 2 and Chemical Formula 3.

4. A method for forming a conductive film including steps of applying the coating liquid according to claim 1 on a surface of a base plate so as to form and fire a film, and thereby changing at least one metal containing material selected from a group including the metal containing materials contained in the film into a conductive film.

5. The method for forming a conductive film according to claim 4 wherein firing is performed in air or in reductive atmosphere.

6. The method for forming a conductive film according to claim 4 wherein a temperature during firing is 350° C. or above.

7. The method for forming a conductive film according to claim 4 wherein a temperature during firing is 700° C. or above.

8. A conductive film formed by the method for forming a conductive film according to claim 4.

9. A conductive film covered product comprising:
a base plate; and
the conductive film according to claim 8 provided on a surface of the base plate.

* * * * *